United States Patent
Hess et al.

(10) Patent No.: US 7,398,198 B2
(45) Date of Patent: Jul. 8, 2008

(54) SYSTEM AND METHOD OF IDENTIFYING A TRANSLATION RESOURCE

(75) Inventors: Gary S. Hess, Raleigh, NC (US); Juan P. Acevedo, San Francisco, CA (US)

(73) Assignee: Translation Science LLC, San Francisco, CA (US)

( * ) Notice: Subject to any disclaimer, the term of this patent is extended or adjusted under 35 U.S.C. 154(b) by 843 days.

(21) Appl. No.: 10/686,924

(22) Filed: Oct. 16, 2003

(65) Prior Publication Data

US 2005/0086043 A1    Apr. 21, 2005

(51) Int. Cl.
*G06F 17/28* (2006.01)
(52) U.S. Cl. ......................................................... 704/2
(58) Field of Classification Search ........................ None
See application file for complete search history.

(56) References Cited

U.S. PATENT DOCUMENTS

| | | | | |
|---|---|---|---|---|
| 6,993,472 | B2 * | 1/2006 | Redpath | 704/2 |
| 7,047,243 | B2 * | 5/2006 | Cabrera et al. | 707/10 |
| 7,095,513 | B2 * | 8/2006 | Stringham | 358/1.13 |
| 2001/0005831 | A1 | 6/2001 | Lewin et al. | 705/5 |
| 2002/0042790 | A1 * | 4/2002 | Nagahara et al. | 707/4 |
| 2002/0095378 | A1 | 7/2002 | Cauchon et al. | 705/40 |
| 2003/0023508 | A1 | 1/2003 | Deep | 705/26 |
| 2003/0033158 | A1 | 2/2003 | Hill et al. | 705/1 |

* cited by examiner

*Primary Examiner*—Abul K Azad
(74) *Attorney, Agent, or Firm*—Blakley Sokoloff Taylor & Zafman LLP

(57) ABSTRACT

A system and method of identifying and allocating translation services in response to a user's request for translation of a document. The system and method of the invention is configured to put a user having a translation request in contact with a candidate translation service via a moderator. The method of the present invention includes registering translation services with the moderator via a website. The moderator creates a profile having contact information of the translation service. The profile further includes one or keys characterizing previously translated documents by the translation service. Upon receiving a user's request for translation of user's document, the moderator matches the keys characterizing the translation service with the user's translation request. The system and method increase the efficiency and lower the cost in locating a translation service having relevant experience in the field of the user's translation request.

32 Claims, 3 Drawing Sheets

SYSTEM AND METHOD OF IDENTIFYING A TRANSLATION RESOURCE

BACKGROUND OF THE INVENTION

1. Field of the Invention

This invention relates to a system for and a method of locating and allocating translation resources. More particularly, it is directed to a system for and a method of locating and allocating candidate translation services through a moderator in response to a translation request, and to a web-based tool for analyzing a continually updated database of documents associated with a candidate translation service so as to facilitate a knowledgeable search.

2. Discussion of the Prior Art

The globalization of the world's economy has increased demand for translation services to translate documents to be filed in and to receive documents from various foreign countries. For example, U.S. patent law requires English translations of patents issued in foreign countries that are filed with the U.S. Patent and Trademark Office, and vice versa.

It is often the case that the same document is repeatedly translated by different translators, as those that need translations have a particular translation source that they use. As a result, both time and money are often wasted by duplicated work. A system that efficiently utilizes the resources that currently exist was therefore desired.

Moreover, there is oftentimes considerable effort expended to find an ideal translator for a given translation job. Although some translation suppliers tend to maintain extensive databases of known translators and translation suppliers, there is typically not much precise insight into exactly what experience a given translator or translation supplier candidate possesses. In fact, a translator may claim on a C.V. to have previously translated documents in the field of electrical engineering, for example, when in reality, that experience, when considered in detail, only involved a translation of a single relatively short document not particularly related to the subject at hand. This is particularly problematic when seeking a translation of a technical document where the experience of the translator is vital to accurately translate the technical terms of the subject document.

In sum, a system and method for intelligently matching translation supplier candidates with those who seek translations was desired. More particularly, a web-based solution that maintains the anonymity of each party and efficiently provides the matching function would be ideal. In doing so, a system was desired that could provide a way to continually become smarter in providing the match between the translation supplier candidate and the user by providing a function of continually updating the database of translated documents to build profiles of the translation service candidates.

SUMMARY OF THE INVENTION

The present invention provides a system and method of locating and allocating candidate translation services in response to a request for a translation of a document. The system and method of the invention is configured to enable a search for a candidate translation service having translation experience relevant to the translation request, to allow a user to determine whether the documents she wants translated have been translated by a certain candidate previously, to preserve the anonymity of the translation service and the person making the request, and to allow the translation service to retain the copyright of the translated document.

According to a first aspect of the preferred embodiment of the present invention, a method for locating and allocating translation services in response to a translation request that includes the Acts of registering a plurality of translation services with a moderator, creating a profile of the plurality of translation service in a database of the moderator, the profile having at least one key characterizing the translation service; receiving at the moderator a translation request from a user; and matching the profile of the plurality translation services with the translation request using the at least one key.

The Act of matching the profile of the plurality of translation services to the translation request can include the Acts of identifying at least one key characterizing the translation request; comparing the at least one key characterizing the translation service with the at least one key characterizing the translation request; and identifying each of the plurality of translation services having the at least one key characterizing the translation service that matches the at least one key characterizing the translation request. In a preferred embodiment, the moderator includes a website in communication with the translation service and the user making the translation request via an internet connection.

According to another aspect of the invention, the Act of creating a profile of each of the plurality translation services includes the step of identifying at least one key characterizing a translated document of the translation service. The key can be a title of a document, a term, etc. that characterizes the document in a way that is informative to a user requesting a translation. The method can further include the steps of downloading a software package to configure a processor to detect a number occurrences of keys characterizing the translated document; providing the detected number of keys characterizing the translated document to the database; and storing the detected number of keys characterizing the translated document with the profile of the translation service.

Another aspect of the present invention is a system for locating and allocating a translation service in response to a translation request. The system includes a processor configured by software stored in memory to provide a website. The website includes a first software configured template having entries to register a translation service, to request contact information, and to receive a list of previously translated documents. The website further includes a second software configured template having entries to obtain information related to a user's request for translation of user's document. The processor can be further configured by the software to assign and store one or more keys representative of the list of previously translated documents, and to compare the one or more keys representative of the list of previously translated documents with the user's request for translation of user's document, and to provide a list of candidate translation services registered on the website having one or more keys matching the user's request.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

Figure 1:
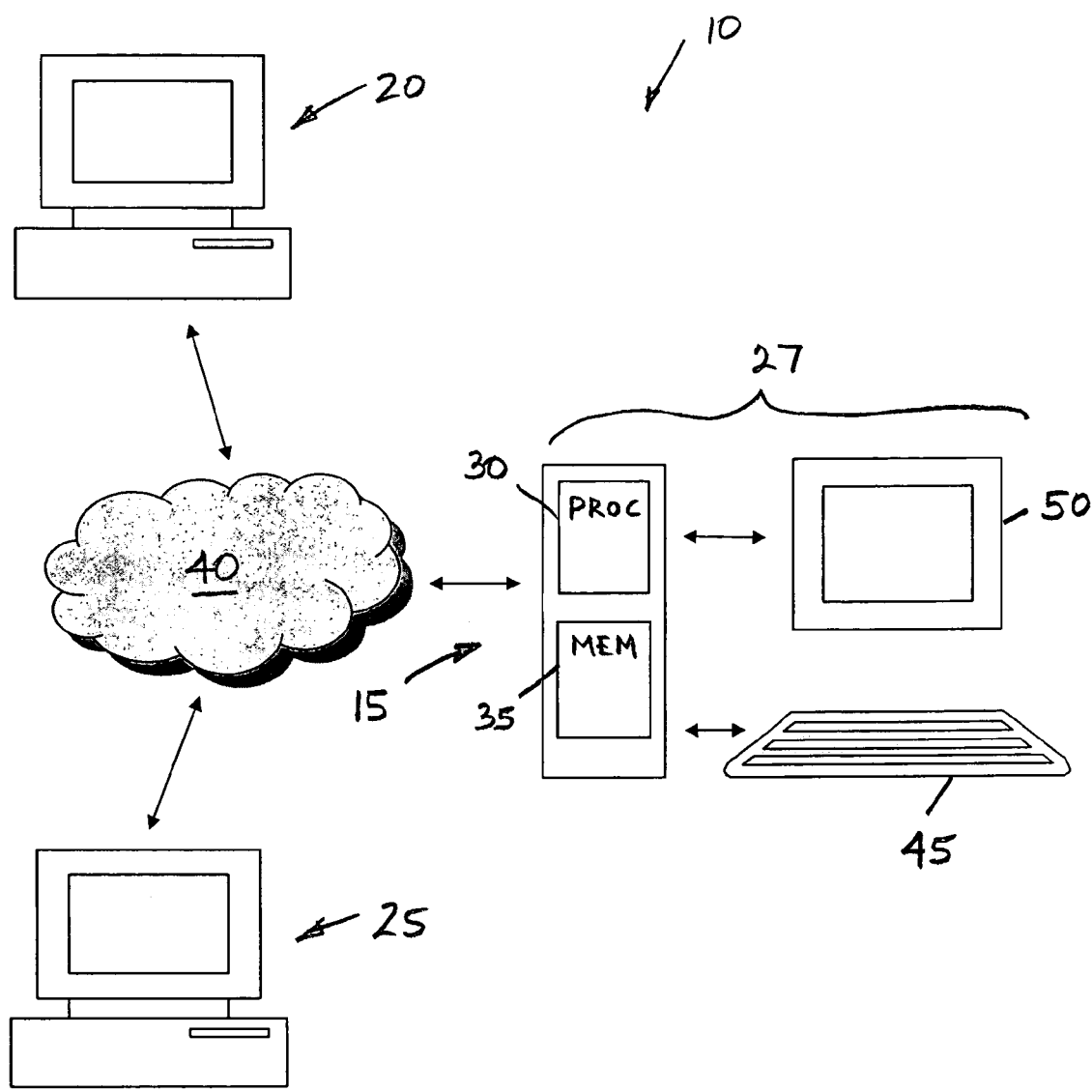
FIG. 1 is a schematic diagram representing one embodiment of the system of the present invention.

Referring initially to FIG. 1, a system 10 embodying the present invention for locating and allocating translation services is shown. The system 10 generally includes a moderator 15 in communication between a translation service 20 and a user 25 making a translation request. Of course, this arrangement is shown for illustrative purposes only, and modifications have been contemplated. For instance, the system will typically include multiple translation services 20 and users 25. Other functions performed by the moderator 15 will be apparent to one skilled in the art from the operation description below.

Figure 2:
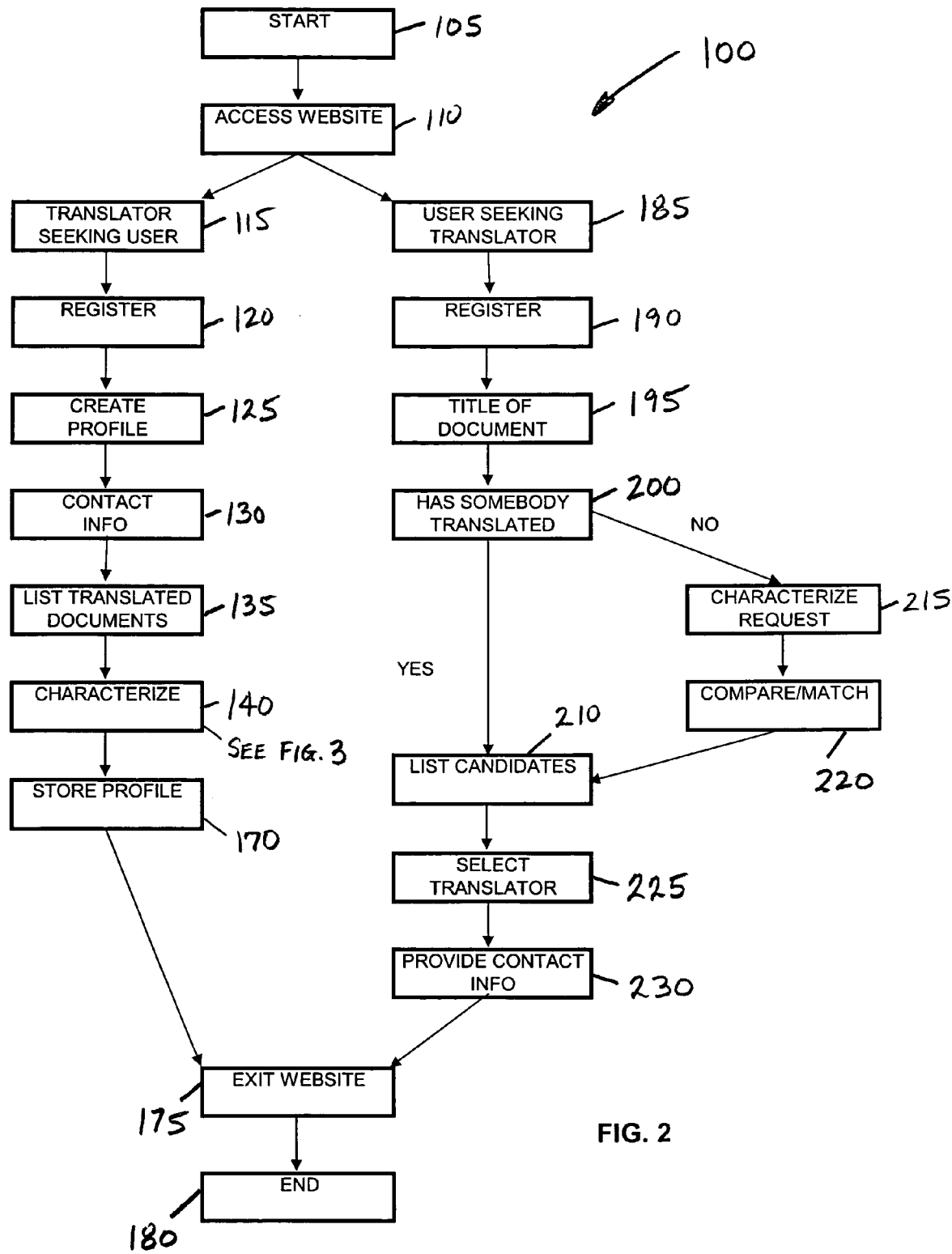
FIG. 2 is a flow diagram of a method for locating a translation service in response to a translation request.

The moderator 15 includes a computer workstation 27 having a processor 30 and a memory 35. The processor 30 obtains, interprets, and executes the instructions of one or more software modules stored in memory 35. An example processor 30 is an INTEL® Pentium processor of a personal computer. The type of processor (e.g., microprocessor, microcontroller, etc.) can vary. The software modules configure the processor 30 to perform, among other things, the method as illustrated in FIG. 2. One embodiment of the moderator includes a website supported by the computer workstation 27. The website includes one or more software configured templates having entries operable to receive data from the translation service 20 and/or the user 25 making the translation request via an internet connection 40.

The moderator 15 further includes one or more input devices 45 that allow an operator to input data to the moderator 15. An example input device includes a keyboard. One or more output devices 50 provide an interface that allows the moderator 15 to provide outputs to the operator. Example output devices include a display screen or monitor or a computer connected via a network.

The translation service 20 and/or the user 25 having a translation request communicates over the internet connection 40 with the website of the moderator 15. Typically, the translation service 20 and/or user 25 with the translation request communicates over the internet connection from remote computer terminals having a web browser. Yet, the mode of communication (e.g., telephone, mail, etc.) can vary.

Having described the basic architecture of the system 10, the operation of the system 10 will now be described. Unless specified otherwise, the operation description below is for the embodiments shown in FIGS. 2 and 3. Furthermore, it is envisioned that not all of the Acts below may be required, that some of the Acts may be modified, or that the order of the Acts may vary.

As shown in FIG. 2, Act 105 includes the start of the method 100. Act 110 includes contacting the moderator 15 by accessing the website via an internet connection 40. In one aspect of the preferred embodiment, the translation service 20 is accessing the website (Act 115). At Act 120, the translation service 20 initiates registration of its services with the website. At Act 125, the moderator 15 initiates creation of a profile of the translation service 20. At Act 130, the moderator 15 requests and receives data including contact information for the translation service 20. At Act 135, the moderator 15 further requests and receives further data including a list of documents previously translated by the translation service 20. In one embodiment, the moderator 15 provides a template on the website with entries for the contact information and the list of previously translated documents. Moreover, in addition to listing translated documents, the translation service 20 could register resume or CV information with the website. Notably, as long as a user remains registered, all this information is updated periodically, preferably automatically according to known methods.

At Act 140, the moderator 15 characterizes one or more characteristics of the translation service, for example, one or more of the previously translated documents. In one embodiment, the previously translated documents are characterized with keys. A key (e.g., a term or phrase, possibly relating to general subject matter, a title, a legal code reference, a patent number, etc.) characterizes the translated document in a way that is informative to a user 25 (or a software analysis program of the moderator that performs, e.g., automatic matching) requesting a translation. Either the moderator 15 and/or the translation service 20 indicate the key(s) to characterize the translation service, i.e., one or more of the service's previously translated documents.

Figure 3:
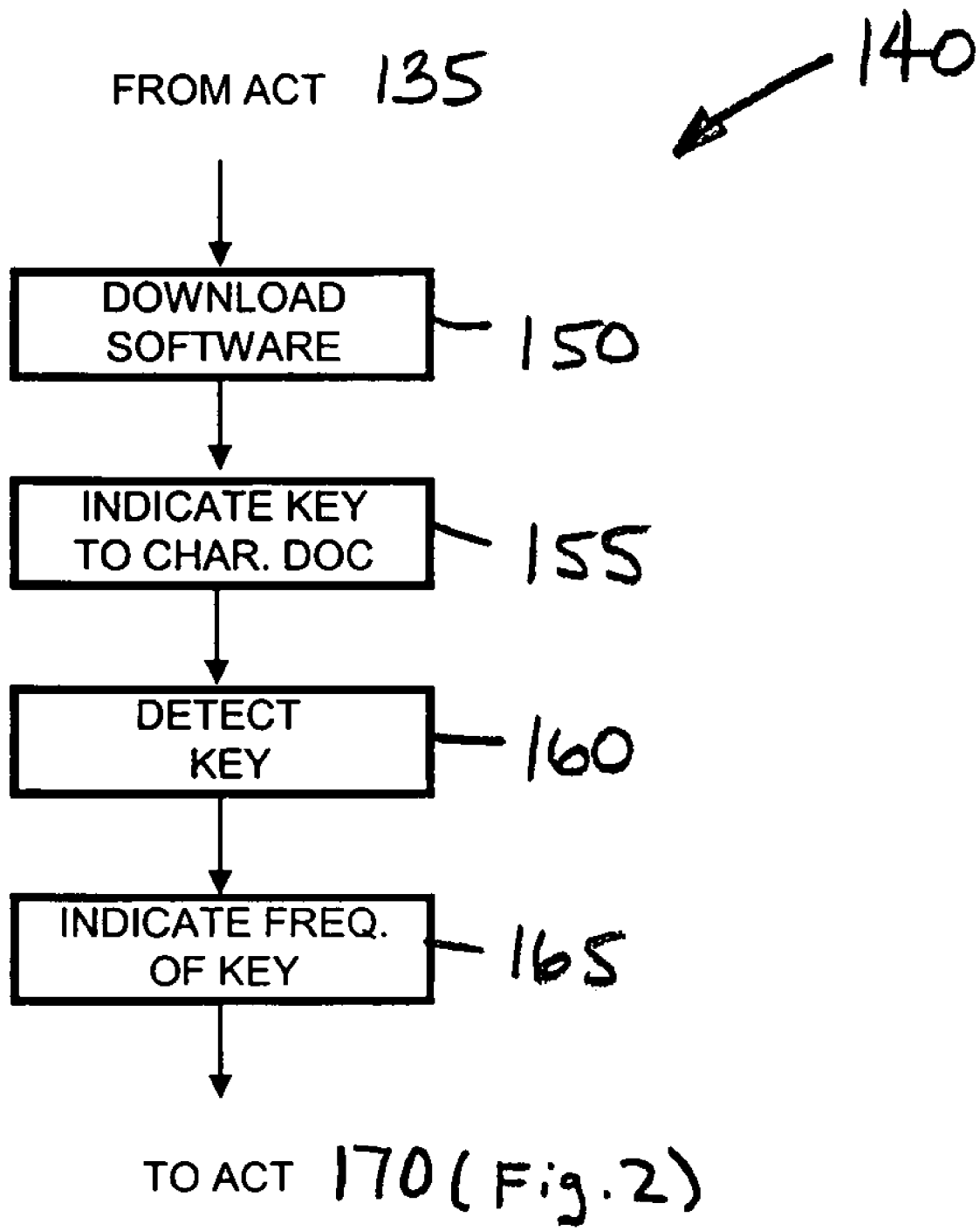
FIG. 3 is a flow diagram of a method of characterizing a translation according to the method show in FIG. 2.

As shown in FIG. 3, one embodiment of the Act 140 of characterizing a previously translated document includes the Act 150 of downloading a software package from the website to the remote computer terminal of the translation service 20. The software package includes one or more software instructions to instruct, preferably, the translation service's computer terminal to characterize the one or more previously translated documents by the translation service 20 in what is called a translator analysis utility (TAU). Alternatively, the software package may be maintained at the moderator, with the characterization process performed at the moderator site. At Act 155, the software package provides a template that includes an entry for a key that characterizes the translated document. Either the translation service and/or the moderator 15 can enter the key manually or from a scroll of selected keys or the key may be assigned by the TAU automatically after corresponding analysis of the previously translated document, as described below. In another embodiment, the software package can provide a directory of codes and respective descriptions for the translation service to manually pick and choose from to characterize the translated document. In yet another embodiment, the key can be a title (e.g., municipal code, state law, patent numerical reference, etc.) representative of the translated document. The key (numerical code, term, alphanumeric code, frequency of search term, etc.) can vary. In another alternative, each document of the translation service is analyzed by the software package. For example, the software package or translator analysis utility (TAU) breaks down the documents into units such as single words, paragraphs, or more preferably, sentences (i.e., units delineated by periods). In this way, the utility identifies key terms (e.g., by ignoring instances of common speech) and creates a user profile for the translation service based on these key terms from their previously translated documents (or resume, for instance).

At Act 160, the software package may include instructions to search the translated document for the pre-selected key in the translated document. In one embodiment, the search of the translated document includes "straight matching," where there is only one possible straight match of terms. A straight match is when all of the word units must be present and in the same order as listed in the search. This type of match is particularly useful in searching for a particular sentence or phrase. In another embodiment, the search of the translated document includes a "fuzzy match" of the search terms. A fuzzy match typically is indicated as a percentage of the presence of the search term. The percentage can be based on word units in a sentence or in the overall document. The fuzzy match can consider sentence length, word presence, word order, conjugations, word endings, punctuation, formatting, etc.

Then, at Act 165, the downloaded software package determines the frequency of occurrence of the one or keys in the translated document, and provides this information to the website of the moderator 15. At Act 170, the moderator 15 stores the profile of the translation service having the contact information, the list of translated documents, and the respective characterization of the translated documents to a memory 35. At Act 175, upon completing the entries provided on the template of the website, the registered translation service 20 exits from the website. Act 180 includes the end of the method 100.

In another aspect of the preferred embodiment and as shown in FIG. 2, a user 25 seeking a candidate to translate a document can access the website (Act 185). At Act 190, the user 25 registers with the website. The Act 190 of registering can include entering an identification and email address, as well as agreeing to certain rules for using the website. At Act 195, the moderator receives information including one or more translation request identifiers, e.g., a title of the document to be translated. In one embodiment, the website provides a template having entries to receive the title of the document, etc. The user 25 can manually enter the title and/or the website can provide a scroll of a list of titles of previously translated documents by registered translation services, or transmit the entire document via the internet to the moderator in a machine readable form for analysis, as described in further detail below.

At Act 200, the moderator determines if the particular document title has been translated by a registered translation service. If the document was previously translated by a registered service, the moderator 15 provides a list of one more candidate registered translation services 20 that performed the translation (Act 210). If the particular translated document title is not found, then the moderator 15 characterizes the translation request (Act 215).

Similar to characterizing a previously translated document, characterizing a translation request may include entering one or more keys that in a way is informative to a moderator 15 in locating a registered translation service 20 having previously translated a document in a related field. Either the moderator 15 and/or the user 25 requesting the translation can indicate the key(s) to characterize the translation request. In one embodiment, the website provides a template with entries for one or more keys to characterizing the translation request. Another embodiment of the template can include drop down menus with a list of predetermined keys for the user 25 to select from. In yet another embodiment, the user 25 (this time the party seeking a translation) can download a software program from the website of the moderator, similar to that described with regard to Act 140, whereby the user can input keys corresponding to their document to be translated, or more preferably, the software package includes a software package utility similar to the TAU, called the translation matching utility (TMU). The TMU automatically breaks down the source document into units, delineated by periods for instance, and creates a source profile assigning keys associated with the document, prior to the system performing a matching function (described below).

At Act 220, the moderator 15 conducts a comparison or match of, for example, the keys of the request with the keys in the stored profiles of the registered translation services 20. Again, this can either be straight matching or fuzzy matching. Upon finding one or more candidate translation services matching the user's request, the moderator 15 provides the list of the one or more candidate registered translation services (Act 210). In one embodiment, display of the list of candidates includes an identification of the translation service, the one or more keys matching the profile of the respective service, and the frequency of the matching keys in the one or more translated documents registered by the candidate translation service. In addition, the list of candidates displayed may be further intelligently limited by setting a threshold number of matched keys that must be met before the translation service will be listed. The order (e.g., descending order of number of occurrences of matches with the request, etc.) of the candidate translation services listed by the website can vary.

In another aspect of the preferred embodiment, the moderator 15 can send a message to one or more of the matching registered translation services 20 to obtain specific information that includes their availability, ability to meet a deadline, pricing, etc. The moderator 15 processes the respective responses from the registered translation service 20, and reports this specific information to the user 25 making the translation request via the web service.

At Act 225, the user 25 selects one or more candidate translation services from the list of matching translation services displayed by the website of the moderator 15. At Act 230, the moderator 15 recalls the contact information of the one or more selected candidate translation services from the database and provides the contact information to the user 25 in need of the translation.

At Act 175, the translation service and/or user 25 needing a translation can exit the website. Act 180 is the end of the method 100. With the contact information of one or more candidate translation services, the user 25 requesting a translation can negotiate directly with the one or more candidate translation services 20. The above-described system 10 and method 100 of the present invention brings a user 25 with a translation request together with a candidate translation service 20 having translation experience relevant to the translation request in a more efficient and less costly manner. Furthermore, the above described system 10 and method 100 also preserves the anonymity of the translation service 20 and the user 25 making the request.

Notably, one problem that has prevented the widespread leveraging of previously translated materials is that the translated materials are often proprietary, i.e., they involve translations paid for and guarded over by a particular translation service 20 (e.g., an in-house translation department at General Motors, a particular translation agency, a particular translator, etc.). Such a translation service 20 will oftentimes aggressively protect its database of previously translated materials because if unfettered access were allowed to such translation materials, the translation materials could be exploited by a competitor.

However, the preferred embodiment offers a new way of allowing such materials to be shared in a controlled manner so that the moderator 15 (or a translation user 25 via the moderator 15) can gain insight into the store of previous translations of one or more translation services 20, without being allowed actual access to the store of translations, for the purpose of identifying the best translation service 20 for the user's purposes. If the translation service does not want to do business with the user, that is its prerogative. However, this feature of the preferred embodiment does allow a translation service 20 to potentially gain new clients and resell existing translations based on its previous store of translations if it chooses to do so.

The scope of the application is not to be limited by the description of the preferred embodiments described above, but is to be limited solely by the scope of the claims that follow.

What is claimed is:

1. A computer-implemented method of identifying a translation service in response to a translation request, the method comprising:
   registering a plurality of translation services with a moderator;
   creating a corresponding profile for each of the plurality of translation services in a database of the moderator, each profile having at least one key characterizing the translation service, wherein creating the corresponding profile for each of the plurality of translation services includes
      downloading a key identifying software program from the moderator to the translation services, the key identifying software operable to count a number of occurrences of a key characterizing a previously translated document, and to provide the number of occurrences of a key characterizing the previously translated document to the moderator via an internet connection, and
      storing the number of occurrences of the key characterizing the translated document in the profile of the translation service;
   receiving at the moderator a translation request from a user; and
   matching at least one of the profiles with the translation request using the at least one key.

2. The method of claim 1, wherein matching at least one of the profiles with the translation request comprises:
   identifying at least one key characterizing the translation request;
   comparing the at least one key characterizing the translation service with the at least one key characterizing the translation request; and
   determining each of the plurality of translation services having the at least one key characterizing the translation service that matches the at least one key characterizing the translation request.

3. The method of claim 2, further comprising displaying to the user an identification of one or more candidate translation services and an indication of occurrences of the at least one key characterizing the respective candidate translation service that matches one or more of the at least one key characterizing the translation request.

4. The method of claim 3, further comprising:
   receiving a selection of at least one candidate translation service from the identification of the one or more candidate translation services;
   recalling the contact information of the at least one selected candidate translation service from the database; and
   providing the contact information of the selected candidate translation service to the user.

5. The method of claim 4, wherein the at least one key characterizing the translation service is indicative of a characteristic of at least one translated document.

6. The method of claim 5, wherein the characteristic of the at least one translated document is one or more of a group including an identifying number, an identifying word and an identifying phrase.

7. The method of claim 2, wherein identifying at least one key characterizing the translation request comprises using a software package operable to configure a processor to count a number occurrences of the at least one key characterizing the translation request.

8. The method of claim 7, wherein the software package is operable to configure a processor to provide the number of occurrences of the at least one key characterizing the translation request to the website.

9. The method of claim 2, wherein identifying at least one key characterizing the translation request comprises receiving a designated term entered into an entry of a software configured template of the website.

10. The method of claim 2, wherein the determining act includes using fuzzy matching.

11. The method of claim 1, wherein the moderator includes a website in communication via an internet connection with the translation service and the user making the translation request.

12. The method of claim 11, wherein registering a plurality of translation services comprises entering requested data into one or more entries of a first software defined user template on the website.

13. The method of claim 12, wherein the requested data includes a contact information and a list of documents translated by the translation service.

14. The method of claim 11, wherein receiving at the moderator a translation request comprises entering requested data entered into one or more entries of a second software defined template on the website, the requested data including a contact information and one or more keys characterizing the translation request.

15. The method of claim 1, wherein the at least one key of the profile of the translation service includes titles of previously translated documents by the respective translation service.

16. The method of claim 1, wherein creating the profile of the translation service comprises:
   transmitting a software package to configure each translation service's computer to detect a number occurrences of the at least one key characterizing the translation service; and
   providing the number of occurrences of the at least one key characterizing the translation service to the database via an internet connection.

17. The method of claim 16, wherein creating the profile of the translation service further comprises storing the detected number in the profile of the translation service in the database.

18. The method of claim 1, wherein the key characterizing the translation service includes one or more terms characterizing a previously translated document of the translation service.

19. A computer-readable storage medium having computer instructions stored therein, which when executed by a computer, cause the computer to perform a method, the method comprising:
   registering a plurality of translation services with a moderator;
   creating a corresponding profile for each of the plurality of translation services in a database of the moderator, each profile having at least one key characterizing the translation service, wherein creating the corresponding profile for each of the plurality of translation services includes downloading a key identifying software program from the moderator to the translation service, the key identifying software program operable to count a number of occurrences of a key characterizing a previously translated document, and to provide the number of occurrences of a key characterizing the previously translated document to the moderator via an internet connection, and storing the number of occurrences of the key characterizing the translated document in the profile of the translation service;

receiving at the moderator a translation request from a user; and matching at least one of the profiles with the translation request using the at least one key.

20. The computer-readable storage medium of claim 19, wherein matching at least one of the profiles with the translation request comprises:

identifying at least one key characterizing the translation request;

comparing the at least one key characterizing the translation service with the at least one key characterizing the translation request; and determining each of the plurality of translation services having the at least one key characterizing the translation service that matches the at least one key characterizing the translation request.

21. The computer-readable storage medium of claim 20, wherein the method further comprises displaying to the user an identification of one or more candidate translation services and an indication of occurrences of the at least one key characterizing the respective candidate translation service that matches one or more of the at least one key characterizing the translation request.

22. The computer-readable storage medium of claim 21, wherein the method further comprises:

receiving a selection of at least one candidate translation service from the identification of the one or more candidate translation services;

recalling the contact information of the at least one selected candidate translation service from the database; and providing the contact information of the selected candidate translation service to the user.

23. The computer-readable storage medium of claim 22, wherein the at least one key characterizing the translation service is indicative of a characteristic of at least one translated document.

24. The computer-readable storage medium of claim 23, wherein the characteristic of the at least one translated document is one or more of a group including an identifying number, an identifying word and an identifying phrase.

25. The computer-readable storage medium of claim 19, wherein the moderator includes a website in communication via an internet connection with the translation service and the user making the translation request.

26. The computer-readable storage medium of claim 25, wherein registering a plurality of translation services comprises entering requested data into one or more entries of a first software defined user template on the website.

27. The computer-readable storage medium of claim 26, wherein the requested data includes a contact information and a list of documents translated by the translation service.

28. The computer-readable storage medium of claim 25, wherein receiving at the moderator a translation request comprises entering requested data entered into one or more entries of a second software defined template on the website, the requested data including a contact information and one or more keys characterizing the translation request.

29. The computer-readable storage medium of claim 19, wherein the at least one key of the profile of the translation service includes titles of previously translated documents by the respective translation service.

30. The computer-readable storage medium of claim 19, wherein creating the profile of the translation service comprises:

transmitting a software package to configure each translation service's computer to detect a number occurrences of the at least one key characterizing the translation service; and providing the number of occurrences of the at least one key characterizing the translation service to the database via an internet connection.

31. The computer-readable storage medium of claim 30, wherein creating the profile of the translation service further comprises storing the detected number in the profile of the translation service in the database.

32. A data processing system, comprising:

a processor; and a memory coupled to the processor for storing instructions, which when executed from the memory, cause the processor to perform a method, the method including registering a plurality of translation services with a moderator, creating a corresponding profile for each of the plurality of translation services in a database of the moderator, each profile having at least one key characterizing the translation service, wherein creating the corresponding profile for each of the plurality of translation services includes downloading a key identifying software program from the moderator to the translation service, the key identifying software program operable to count a number of occurrences of a key characterizing a previously translated document, and to provide the number of occurrences of a key characterizing the previously translated document to the moderator via an internet connection, and storing the number of occurrences of the key characterizing the translated document in the profile of the translation service, receiving at the moderator a translation request from a user, and matching at least one of the profiles with the translation request using the at least one key.

* * * * *